(12) United States Patent
Hu et al.

(10) Patent No.: US 8,950,704 B2
(45) Date of Patent: Feb. 10, 2015

(54) COLD-LAUNCH DEVICE AND METHOD USING THE SAME

(76) Inventors: Xuanzhe Hu, Zhuzhou (CN); Zhenhua Hu, Zhuzhou (CN); Aiwu Hu, Zhuzhou (CN)

( * ) Notice: Subject to any disclaimer, the term of this patent is extended or adjusted under 35 U.S.C. 154(b) by 172 days.

(21) Appl. No.: 13/036,032

(22) Filed: Feb. 28, 2011

(65) Prior Publication Data

US 2011/0147516 A1    Jun. 23, 2011

Related U.S. Application Data

(63) Continuation of application No. PCT/CN2009/000963, filed on Aug. 21, 2009.

(30) Foreign Application Priority Data

Sep. 19, 2008 (CN) .......................... 2008 1 0143241

(51) Int. Cl.
   *B64F 1/02* (2006.01)
   *B64F 1/06* (2006.01)

(52) U.S. Cl.
   CPC ....................................... *B64F 1/06* (2013.01)
   USPC ............................................................. 244/63

(58) Field of Classification Search
   USPC ..................... 244/63, 64; 91/4 R, 167 R, 168
   See application file for complete search history.

(56) References Cited

U.S. PATENT DOCUMENTS

| | | | | |
|---|---|---|---|---|
| 1,802,649 | A * | 4/1931 | Heinkel .......................... | 244/63 |
| 3,086,423 | A * | 4/1963 | Chamberlin et al. ........... | 91/4 R |
| 3,956,970 | A * | 5/1976 | Kupiek et al. ................... | 91/173 |
| 6,675,698 | B1 * | 1/2004 | Shteynberg ...................... | 92/143 |

* cited by examiner

*Primary Examiner* — Tien Dinh
*Assistant Examiner* — Vicente Rodriguez
(74) *Attorney, Agent, or Firm* — Raymond Y. Chan; David and Raymond Patent Firm

(57) ABSTRACT

A cold-launch device, including a high-energy gas resource, a gas cylinder, a control valve, a gas-liquid mixing cylinder having a cylinder body, the high-energy gas resource is connected to the gas cylinder whereby supplying energy thereto, and the gas cylinder is connected to an terminal of the gas-liquid mixing cylinder via the control valve and a connecting pipe.

16 Claims, 3 Drawing Sheets

COLD-LAUNCH DEVICE AND METHOD USING THE SAME

CROSS-REFERENCE TO RELATED APPLICATIONS

This application is a continuation of International Patent Application No. PCT/CN2009/000963 with an international filing date of Aug. 21, 2009, designating the United States, now pending, and further claims priority benefits to Chinese Patent Application No. 200810143241.6 filed on Sep. 19, 2008. The contents of all of the aforementioned applications, including any intervening amendments thereto, are incorporated herein by reference.

BACKGROUND OF THE INVENTION

1. Field of the Invention

The invention relates to a cold-launch device and a method using the same

2. Description of the Related Art

Aircraft launch systems are widely used in the military field. Conventional launch systems are divided into steam-driven launch system, and electromagnetic aircraft launch systems (EMALS).

Problems with the steam-driven launch system are that, the system is too big, complex, expensive, and low efficient (only 4-6%), and is difficult for repairing, which make it incapable of meeting launch requirement of larger aircrafts.

The EMALS system also has its disadvantages: 1) forced power storage is not good; 2) too many intermediate devices, such as high-power electronic devices for increasing voltage and frequency, are required; 3) it features large electromagnetic interference, which affects application of high-sensitivity aircrafts and guidance systems; 4) it uses eddy-current and phase-shift brake, which is not safe enough; 5) it cannot facilitate timely and selective launch in extreme conditions, such as emergent events, severe sea condition, and so on, large size thereof greatly affects the number of shipboard aircrafts, and heavy height greatly affects stability and righting moment of ships.

SUMMARY OF THE INVENTION

In view of the above-described problem, it is one objective of the invention to provide a cold-launch device that is capable of addressing the above-mentioned problems.

It is another objective of the invention to provide a launching energy recovery device that is capable of addressing the above-mentioned problems.

It is a further objective of the invention to provide a cold-launch method that is capable of addressing the above-mentioned problems.

To achieve the above objectives, in accordance with one embodiment of the invention, provided is a cold-launch device, comprising a high-energy gas resource, a gas cylinder, a control valve, a gas-liquid mixing cylinder having a cylinder body, the high-energy gas resource is connected to the gas cylinder whereby supplying energy thereto, and the gas cylinder is connected to an terminal of the gas-liquid mixing cylinder via the control valve and a connecting pipe.

In a class of this embodiment, the terminal of the gas-liquid mixing cylinder is a gas receiving terminal, and the other terminal thereof is a liquid receiving terminal.

In a class of this embodiment, a gas port is disposed on wall of the gas receiving terminal.

In a class of this embodiment, multiple multi-stage pistons sequentially connected to each other are disposed in the gas receiving terminal, and an oil outlet is disposed on wall of each stage of the pistons.

In a class of this embodiment, hydraulic oil is filled in the liquid receiving terminal.

In a class of this embodiment, the high-energy gas resource uses pressure gas or steam.

In a class of this embodiment, the high-energy gas resource is a small air compressor.

In accordance with another embodiment of the invention, provided is a launching energy recovery device, comprising an energy recovery pump, a lifting cylinder, a shuttle vehicle, a sensor, a stop cylinder, and a guide rail, the shuttle vehicle operates as a carrier for an aircraft, the energy recovery pump and the lifting cylinder are disposed on the shuttle vehicle, the shuttle vehicle is disposed on the guide rail, and the sensor and the stop cylinder are disposed in the front of the guide rail.

In a class of this embodiment, a head of the energy recovery pump is aligned with the stop cylinder whereby absorbing inertia energy of a launching system and transforming the inertia energy into hydraulic energy.

In a class of this embodiment, an output end of the energy recovery pump is connected to the lifting cylinder via a pipe, and the front of the lifting cylinder is connected to the air craft.

In a class of this embodiment, a buffer spring is disposed in each of the energy recovery pump, the lifting cylinder, and the stop cylinder.

In a class of this embodiment, a damping hole is disposed on a piston of the stop cylinder.

In accordance with a further embodiment of the invention, provided is a launching energy recovery device, comprising an energy recovery pump, a lifting cylinder, a shuttle vehicle, a sensor, a guide rail, and a flexible rail, the flexible rail is hinged to the front of the guide rail, the shuttle vehicle operates as a carrier for an aircraft, the shuttle vehicle is disposed on the guide rail, the sensor and the energy recovery pump are disposed in the front of the flexible rail, an output end of the energy recovery pump is connected to the lifting cylinder via a pipe, and the top of the lifting cylinder is connected to the flexible rail.

In a class of this embodiment, a buffer spring is disposed in each of the energy recovery pump and the lifting cylinder.

In accordance with still another embodiment of the invention, provided is a cold-launch method, comprising enabling high-energy gas in a gas cylinder to enter a gas receiving terminal of a gas-liquid mixing cylinder via a control valve as a cold-launch device is completed closed, simultaneously pushing all stages of pistons on a liquid receiving terminal of the gas-liquid mixing cylinder, and launching a load at a constant power.

Advantages of the Invention Comprise 1) since energy is supplied via gas, and conventional forced energy storage is not required;

2) energy is suddenly reduced via elastomers, various launch speeds can be facilitated;

3) since hydraulic transmission is used, ultra-high efficient transmission of enormous energy can be facilitated;

4) the cold-launch device features simple structure, small size, light weight, easy production, and low cost, and requires small number of operators and repairmen;

5) the cold-launch device can make use of the best launch time, and overcomes problems caused by shipboard aircrafts that take off under severe sea condition, as prows descend, or at night;

6) since inertia energy is recovered, power consumption during launching and takeoff distance are greatly reduced, continuity of launch is improved, which make the invention applicable to various types of ships; and 7) the cold-launch device can launch aircrafts as being completely closed by surprise, whereby controlling air supremacy.

Figure 1:
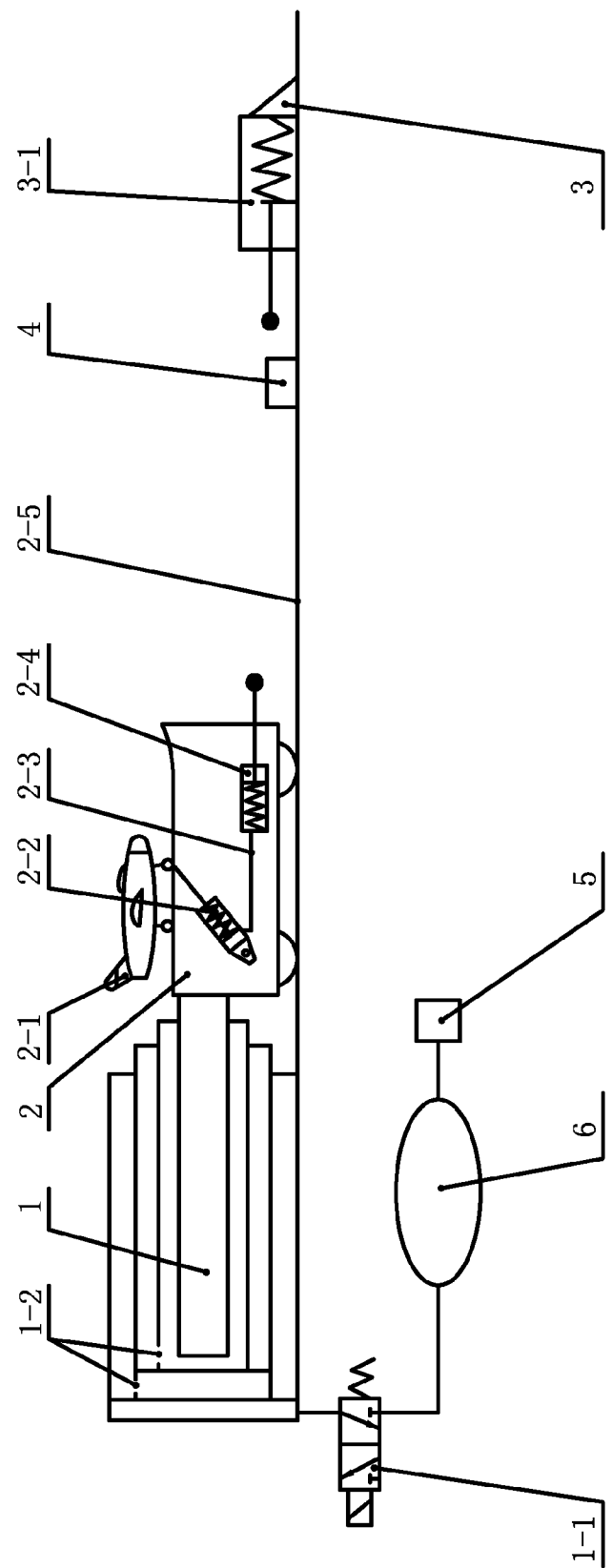
FIG. 1 is a schematic view of a cold-launch device of an exemplary embodiment of the invention.

In the drawings, the following reference numbers are used: 1—gas-liquid mixing cylinder; 1-1—control valve; 1-2—oil outlet; 2—shuttle vehicle; 2-1—shipboard aircraft; 2-2—lifting cylinder; 2-3—connecting pipe; 2-4—energy recovery pump; 2-5—guide rail; 2-6—flexible rail; 3—stop cylinder; 3-1—damping hole; 4—sensor; 5—high-energy gas resource; 6—gas cylinder; 7—gas port; 8—gas receiving terminal; 9-liquid receiving terminal; 10—first-stage piston; 11—second-stage piston; 12—third-stage piston; 13—hydraulic oil; 14—cylinder body.

DETAILED DESCRIPTION OF THE EMBODIMENTS

Figure 2:
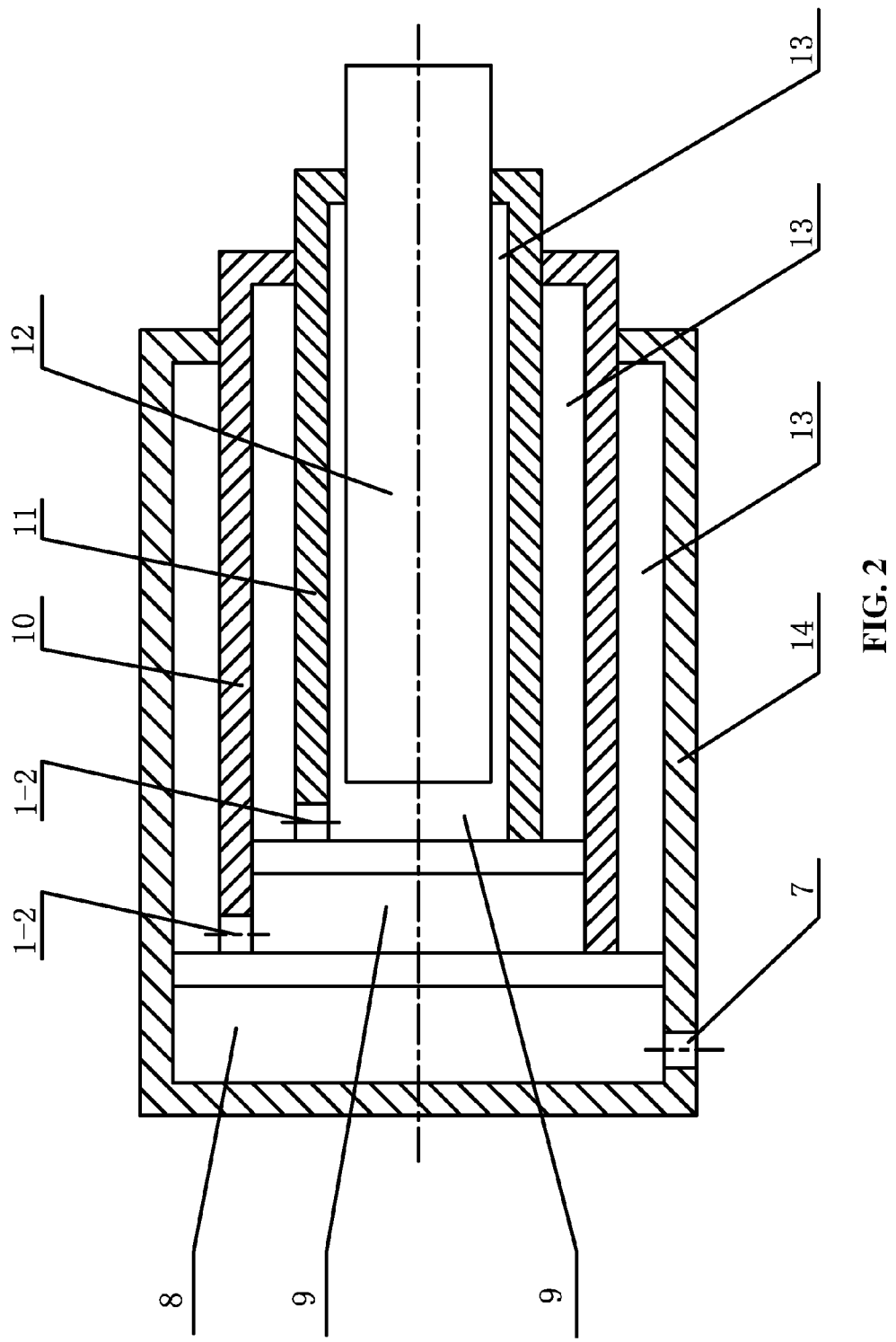
FIG. 2 is a cross-sectional view of a gas-liquid mixing cylinder.

As shown in FIGS. 1 and 2, a cold-launch device of a first embodiment of the invention comprises a gas-liquid mixing cylinder 1, a control valve 1-1, a high-energy gas resource 5, and a gas cylinder 6. In this embodiment, the gas-liquid mixing cylinder 1 is a three-stage gas-liquid mixing cylinder, and the control valve 1-1 is a two-position three-way electromagnetic control valve.

A buffer spring is disposed in each of an energy recovery pump 2-4, a lifting cylinder 2-2, and a stop cylinder 3. A damping hole 3-1 is disposed on the stop cylinder 3.

In operation, after a certain launch condition is given, the high-energy gas resource 5 supplies high-energy gas to the gas cylinder and then stops working. The launch device is always in a stand-by state as it is completely closed. During a war, the control valve 1-1 can be powered without any waiting time, and controls part of the high-energy gas in the gas cylinder to enter the gas receiving terminal of the gas-liquid mixing cylinder 1 via a gas port 7 whereby driving a piston to move forwardly and compressing hydraulic oil between a cylinder barrel and the piston. Then the hydraulic oil enters the next piston cylinder body, and drives the next-stage piston and a shuttle vehicle 2 to pull an aircraft 2-1 whereby enabling it to move along a guide rail 2-5 at a high speed with a constant power, and thus launch of the aircraft is implemented. Once the shuttle vehicle 2 pulling the aircraft 2-1 moves to a damping position, a sensor 4 sends a signal and automatically switches off a power supply of the control valve 1-1. At this time the control valve 1-1 is reversed and unloads the gas-liquid mixing cylinder 1. After that, the energy recovery pump 2-4 having a head aligned with the stop cylinder 3 is driven by inertia energy of the launch device, collides with the stop cylinder 3, pumps out pressure oil, and transforms the inertia energy into hydraulic energy. The pressure oil then enters the lifting cylinder 2-2 via a connecting pipe 2-3, and thus the hydraulic energy is transformed into mechanical energy, which drives the aircraft 2-1 to semi-autonomously take off at an appropriate elevation angle. Then, buffer springs in the energy recovery pump 2-4, the lifting cylinder 2-2, and the stop cylinder 3 release energy and reset the energy recovery pump 2-4, the lifting cylinder 2-2, the stop cylinder 3, and the shuttle vehicle 2, whereby preparing for the next launch.

As shown in FIG. 2, structure of the gas-liquid mixing cylinder 1 is: a gas receiving terminal 8 is disposed on one end of the cylinder body 14, a gas port 7 is disposed on wall of the gas receiving terminal 8, and multiple stages of pistons are disposed in the cylinder body 14. A first-stage piston 10, a second-stage piston 11, and a third-stage piston 12 sequentially connected to each other are disposed in the liquid receiving terminal 9. Hydraulic oil 13 is filled in the liquid receiving terminal 9. An oil outlet 1-2 is disposed on each stage of the pistons.

Figure 3:
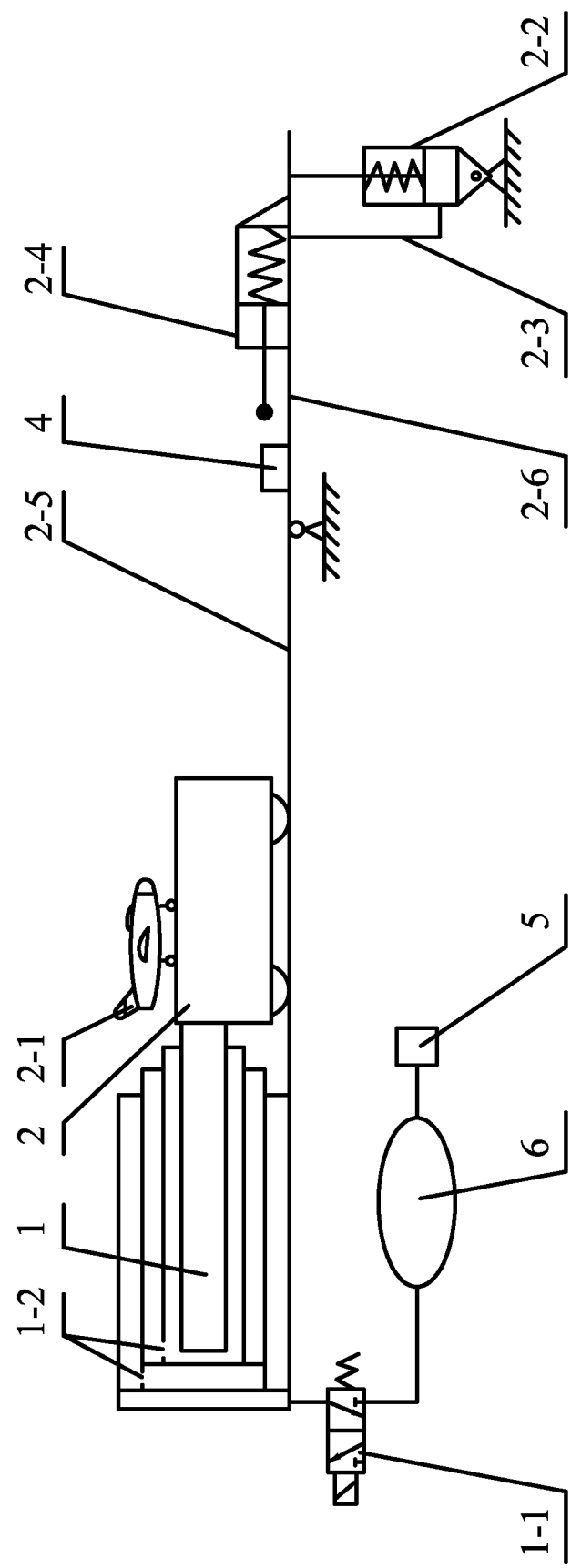
FIG. 3 is a schematic view of a cold-launch device of another exemplary embodiment of the invention.

As shown in FIGS. 2 and 3, a launching energy recovery device of another embodiment of the invention comprises an energy recovery pump 2-4, a lifting cylinder 2-2, a shuttle vehicle 2, a sensor 4, a guide rail 2-5, and a flexible rail 2-6, the flexible rail 2-6 is hinged to the front of the guide rail 2-5, the energy recovery pump 2-4 is disposed in the front of the flexible rail 2-6, and the top of the lifting cylinder 2-2 is connected to the flexible rail 2-6. Once the shuttle vehicle 2 pulling the aircraft 2-1 moves to a damping position, a sensor 4 sends a signal and automatically switches off a power supply of the control valve 1-1. At this time the control valve 1-1 is reversed and unloads the gas-liquid mixing cylinder 1. After that, the shuttle vehicle 2 driven by inertia energy of the launch device collides with the energy recovery pump 2-4, the energy recovery pump 2-4 pumps out pressure oil, and transforms the inertia energy into hydraulic energy. The pressure oil then enters the lifting cylinder 2-2 via a connecting pipe 2-3, and thus the hydraulic energy is transformed into mechanical energy, which lifts the flexible rail 2-6 at an appropriate elevation angle, and drives the aircraft 2-1 to semi-autonomously take off.

The whole process is close-loop controlled via numerical control, and energy supplement does not occupy special time.

A cold-launch method of the invention comprises: enabling high-energy gas in a gas cylinder to enter a gas receiving terminal of a gas-liquid mixing cylinder via a control valve as a cold-launch device is completed closed, simultaneously pushing all stages of pistons on a liquid receiving terminal of the gas-liquid mixing cylinder, and launching a load at a constant power.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A cold-launch device for pushing a shuttle vehicle, comprising:
   a gas cylinder arranged for storing a high-energy gas;
   a gas-liquid cylinder including a cylinder body, and having a gas receiving terminal for receiving said high-energy gas from said gas cylinder, and a liquid receiving terminal for containing hydraulic oil;
   a plurality of pistons constituting a multi-stage compression, said pistons being disposed in said cylinder body and arranged in said liquid receiving terminal, and each of said pistons having an end wall, a side wall and a hollow chamber limited by said end wall and said side wall, wherein said end wall of a first piston separates said gas receiving terminal and said liquid receiving terminal, and except the last piston, said hollow chamber of each of said pistons receives another adjacent piston, such that said pistons sequentially are connected to each other; and an oil outlet being provided on said side wall of each of said pistons, wherein under a pressure of said high-energy gas in said gas receiving terminal, said pistons driven by said hydraulic oil contained in said liquid receiving terminal are simultaneously moved forward to provide a constant power so that a pushing force generated by said pistons being transmitted to said shuttle vehicle to cause said shuttle vehicle to move forward in a high speed.

2. The cold-launch device, as recited in claim 1, wherein said pistons have different outer diameters and hollow chambers with different inner diameter respectively, wherein one of two adjacent pistons has a larger outer diameter and a hollow chamber with a larger inner diameter, and the other has a smaller outer diameter and a hollow chamber with a smaller inner diameter, wherein said piston having said smaller outer diameter being disposed in said hollow chamber with said larger inner diameter of said piston having said larger outer diameter so that said pistons are nested together.

3. The cold-launch device, as recited in claim 2, wherein said oil outlet provided on said side wall of each of said pistons is used for communicating between said hollow chambers of said two adjacent pistons so as to guide said hydraulic oil to enter into said other from one of said hollow chambers of said two adjacent pistons.

4. The cold-launch device, as recited in claim 3, wherein said two adjacent pistons nested together constitute one stage compression of said multi-stage compressions, wherein one of said two adjacent pistons having said smaller outer diameter extends out from said hollow chamber of another said piston having said larger outer diameter when said hydraulic oil contained in said liquid receiving terminal is compressed.

5. The cold-launch device, as recited in claim 1, wherein said last piston is connected to said shuttle vehicle.

6. The cold-launch device, as recited in claim 1, further comprising a two-position three-way electromagnetic control valve operatively linked between said gas receiving terminal of said gas-liquid cylinder and said gas cylinder for controlling said high-energy gas flowing into or out of said gas receiving terminal, wherein said two-position three-way electromagnetic control valve is operable to load or unload said pistons in said gas-liquid cylinder.

7. The cold-launch device, as recited in claim 1, wherein said pistons include a first-stage piston, a second-stage piston, and a third-stage piston, wherein said first-stage piston has a larger outer diameter and a hollow chamber with a large inner diameter, wherein said second-stage piston has a small outer diameter and a hollow chamber with a small inner diameter, wherein said third-stage piston has the smallest outer diameter;

said third-stage piston being disposed in said hollow chamber of said second-stage piston, and said second-stage piston being disposed in said hollow chamber of said first-stage piston;

wherein a compressed hydraulic oil being introduced from a space between said cylinder body and said side wall of said first-stage piston into said hollow chamber of said first-stage piston through said oil outlet provided on said side wall of said first-stage piston, and introduced from a space between said side wall of said first-stage piston and said side wall of said second-stage piston located in said hollow chamber of said first-stage piston into said hollow chamber of said second-stage piston through said oil outlet provided on said side wall of said second-stage piston consecutively when said first-stage piston is driven by said high-energy gas in said gas receiving terminal so that said first-stage piston, said second-stage piston, and said third stage piston are pushed forward simultaneously.

8. The cold-launch device, as recited in claim 7, wherein said gas-liquid cylinder is a gas-oil cylinder having a three-stage compression.

9. The cold-launch device, as recited in claim 7, further comprising a two-position three-way electromagnetic control valve operatively linked between said gas receiving terminal of said gas-liquid cylinder and said gas cylinder for controlling said high-energy gas flowing into or out of said gas receiving terminal, wherein said two-position three-way electromagnetic control valve is operable to load or unload said pistons in said gas-liquid cylinder.

10. The cold-launch device, as recited in claim 6, further comprising a gas port provided on a wall of said cylinder body, wherein said two-position three-way electromagnetic control valve is in communication with said gas receiving terminal of said gas-liquid cylinder through said gas port.

11. The cold-launch device, as recited in claim 9, further comprising a gas port provided on a wall of said cylinder body, wherein said two-position three-way electromagnetic control valve is in communication with said gas receiving terminal of said gas-liquid cylinder through said gas port.

12. The cold-launch device, as recited in claim 11, wherein said high-energy gas is a steam.

13. The cold-launch device, as recited in claim 11, wherein said high-energy gas is a compressed gas produced by a small air compressor.

14. A cold-launch device for pushing a shuttle vehicle, comprising:

a gas cylinder arranged for storing a high-energy gas;

a gas-liquid cylinder having a gas receiving terminal for receiving said high-energy gas from said gas cylinder and a liquid receiving terminal for containing hydraulic oil; and a piston means for generating a pushing force to the shuttle vehicle to launch an aircraft on said shuttle vehicle in a high speed, wherein said piston means comprises a first-stage piston, a second-stage piston, and a third-stage piston, wherein said first-stage piston, said second-stage piston, and said third-stage piston are disposed in said gas-liquid cylinder and sequentially connected to each other, and each of them having an end wall, a side wall and a hollow chamber limited by said end wall and said side wall wherein said end wall of said first-stage piston separates said gas receiving terminal and said liquid receiving terminal, wherein said piston means further comprises an oil outlet provided at a said side wall of each of said first-stage piston and said second-stage piston for guiding said hydraulic oil to flow between two adjacent pistons of said first-stage piston, said second-stage piston, and said third-stage piston, wherein when said high-energy gas enters into said gas receiving terminal from said gas cylinder, said compressed hydraulic oil acts on said first-stage piston, said second-stage piston and said third-stage piston through said respective oil outlets on said side walls of said first-stage piston and said second-stage piston consecutively while said high-energy gas drives said first-stage piston to move forward and compresses said hydraulic oil contained in said liquid receiving terminal, such that said first-stage piston, said second-stage piston, and said third-stage piston are driven forward simultaneously for generating said pushing force with a constant power to said shuttle vehicle.

15. The cold-launch device, as recited in claim 14, further comprising a two-position three-way electromagnetic control valve operatively linked between said gas receiving terminal of said gas-liquid cylinder and said gas cylinder for controlling said high-energy gas flowing into or out of said gas receiving terminal, wherein said two-position three-way electromagnetic control valve is operable to load or unload said pistons in said gas-liquid cylinder.

16. The cold-launch device, as recited in claim 15, further comprising a gas port provided on a wall of a cylinder body of said gas-liquid cylinder, wherein said two-position three-way electromagnetic control valve is in communication with said gas receiving terminal of said gas-liquid cylinder through said gas port.

\* \* \* \* \*